United States Patent
Kessler et al.

(10) Patent No.: US 9,605,996 B2
(45) Date of Patent: Mar. 28, 2017

(54) APPARATUS FOR MONITORING A ROTATING MACHINE PART

(75) Inventors: Hans-Willi Kessler, Langerwehe (DE); Klaus Vaehsen, Dusseldorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 360 days.

(21) Appl. No.: 13/817,602

(22) PCT Filed: Aug. 1, 2011

(86) PCT No.: PCT/EP2011/063183
§ 371 (c)(1),
(2), (4) Date: Jul. 31, 2013

(87) PCT Pub. No.: WO2012/022602
PCT Pub. Date: Feb. 23, 2012

(65) Prior Publication Data
US 2013/0305827 A1  Nov. 21, 2013

(30) Foreign Application Priority Data
Aug. 19, 2010  (DE) .................. 10 2010 034 749

(51) Int. Cl.
| G01H 1/00 | (2006.01) |
| G01H 9/00 | (2006.01) |
| G01M 13/02 | (2006.01) |
| H04Q 9/00 | (2006.01) |
| G01M 13/04 | (2006.01) |

(52) U.S. Cl.
CPC ............. *G01H 1/003* (2013.01); *G01H 1/006* (2013.01); *G01H 9/00* (2013.01); *G01H 9/004* (2013.01); *G01M 13/02* (2013.01); *G01M 13/045* (2013.01); *H04Q 9/00* (2013.01); *H04Q 2209/43* (2013.01); *H04Q 2209/886* (2013.01)

(58) Field of Classification Search
CPC ................................ G01H 1/003; G01H 1/006
See application file for complete search history.

(56) References Cited

U.S. PATENT DOCUMENTS

| 4,237,454 A | 12/1980 | Meyer |
| 7,468,655 B2 | 12/2008 | Logan |
| 7,559,239 B2 | 7/2009 | Ens et al. |
| 8,393,993 B2 | 3/2013 | Demtroeder |
| 2008/0279686 A1* | 11/2008 | Demtroder .............. 416/61 |

(Continued)

FOREIGN PATENT DOCUMENTS

| CN | 101375053 | 2/2009 |
| CN | 100533092 | 8/2009 |

(Continued)

OTHER PUBLICATIONS

Toutountzakis et al. "Observations of Acoustic Emission activity during gear defect diagnosis" NDT and E International, 36 (7), pp. 471-477, 2003.*

Primary Examiner — Paul West
(74) Attorney, Agent, or Firm — Volpe and Koenig, P.C.

(57) ABSTRACT

An apparatus for monitoring a machine element (02), which moves with respect to a base and rotates about its own axis, having a sensor (06) and evaluation electronics (09). According to the invention, the sensor (06) and the evaluation electronics (09) and also a power supply unit and a transmitter unit (12) are arranged on the moving machine element (02).

9 Claims, 1 Drawing Sheet

(56) References Cited

U.S. PATENT DOCUMENTS

| | | | |
|---|---|---|---|
| 2010/0074567 A1* | 3/2010 | Giordana | 384/448 |
| 2010/0089144 A1* | 4/2010 | Engler et al. | 73/168 |

FOREIGN PATENT DOCUMENTS

| | | |
|---|---|---|
| DE | 4101985 | 7/1992 |
| DE | 4432808 | 3/1995 |
| DE | 19924955 | 12/1999 |
| DE | 10325801 | 1/2005 |
| DE | 102006058689 | 6/2008 |
| DE | 102009010709 | 9/2009 |
| EP | 1022702 | 7/2000 |
| WO | 2004109249 | 12/2004 |

\* cited by examiner

Detail A

APPARATUS FOR MONITORING A ROTATING MACHINE PART

BACKGROUND

The invention relates to an apparatus for monitoring a machine part which moves or rotates about its own axis and moves with respect to a base.

In the field of vibration diagnosis it is customary to monitor inner components of epicyclic gears or components of a similar type with a sensor system which is arranged on fixed components. Acceleration pickups and solid-borne sensors are possible as sensors above all for this purpose.

In order to increase the operational reliability and ability to plan the maintenance and availability of the system, it has already been established practice for a relatively long time to subject said system to a noise analysis. This makes it possible to detect incipient damage, for example to transmission components or rolling bearings, in good time by virtue of the noise analysis and to correspondingly plan a repair.

DE 44 32 808 A1 discloses a sensor system for monitoring tools, such as, for example, monitoring drills, thread cutting tools, friction tools or milling tools. Vibration signals or solid-borne sound signals of machine elements which can move in a translatory or else rotational fashion and on which tools, workpieces or noise-generating component units are located are tapped in a wireless fashion at a housing which is stationary relative to the tool, and are passed onto a corresponding monitoring device or testing device. At the sensor end, the sensor system has just one housing body, one piezoelectric or electrodynamic vibration element and one primary coil. At the receiver end there is a secondary coil in a corresponding housing.

DE 103 25 801 A1 discloses a sound pickup which is used for the acoustic diagnosis of machines, for example for leakage detection in valves or for the diagnosis of bearings. The sound pickup comprises a piezoelectric measuring element and an electronic circuit which converts the measurement signal into a form which is suitable for transmission to an evaluation device. The sound pickup extracts the energy necessary to operate the electronic circuit from its surroundings. This auxiliary energy is generated from the sound signal which is to be picked up. The transmission of the output signal can take place via cable or alternatively in a wireless fashion by means of radio or infrared light. For example a piezoceramic which is provided with a seismic mass, and which is arranged in the sound pickup in addition to the piezoelectric measuring element, can be provided as a means for generating the auxiliary energy. In this variant, the auxiliary energy can be generated from the electrical measurement signal of the piezoelectric measuring element.

DE 199 24 955 A1 discloses an acoustic measuring instrument for measuring a transmission noise. The intention is to use this measuring instrument to acquire a measurement result which is adapted to the subjective hearing sensation and which can be used as an informative comparison variable. The measuring instrument comprises at least one sensor for sensing an air-borne sound signal and at least one sensor for sensing a solid-borne sound signal. The air-borne sound signal and the solid-borne sound signal and, if appropriate, measurement signals, such as a rotational speed signal, can easily be recorded by means of a two-channel DAT recorder. In this context, in a motor vehicle the solid-borne sound signal pickup is arranged directly on the transmission housing, a microphone is arranged as an air-borne sound signal pickup in the passenger compartment, and a tachometer for detecting the engine speed is arranged in the engine compartment. The sensors may be connected either in a wireless fashion or conductively to the DAT recorder.

DE 10 2006 058 689 A1 discloses a method and an apparatus for diagnosing the state of a machine component, in which the solid-borne sound of functional units is evaluated as vibration data in order to diagnose the state of machines or machine components. The recorded solid-borne sound signal is subjected to a known noise analysis for this purpose. The sensors are arranged on the housing of the machine which is to be monitored.

DE 10 2009 010 709 A1 discloses a movable wireless sensor and a method for the application thereof in a state and deployment monitoring system for a vehicle. A large number of wireless sensors are used in a vehicle, which sensors are configured to monitor one or more components of the vehicle and to transmit state data and/or deployment data to a data access point when these sensors are activated by a vibration of the vehicle. A movable wireless sensor, which may be temporarily located at a first position in order to monitor one or more components of the vehicle and which can then be moved to another position in order to monitor one or more other components of the vehicle, is arranged in the system. As a result, the total number of sensors used to monitor the vehicle is reduced.

DE 41 01 985 A1 discloses a method for determining irregularities of two elements which operate with one another. In particular damage to gearwheels and/or bearings on gearwheel transmissions are to be detected and their location determined by means of this method. An acceleration pickup is fitted to the gearwheel transmission to be examined. The solid-borne sound composite signal is converted into an electrical signal with the acceleration pickup. This signal is processed further and input into a computer. At the start of the measurement, moreover, the ratio of the frequency of the elementary signal of interest with respect to the input rotational frequency is set. The signals are then processed in the computer in accordance with the relationships for the solid-borne sound acceleration signal, and mean values are formed. The signal is evaluated by means of Fourier analysis.

In the case of sensors which are arranged on a transmission housing, an undefined transmission function of the sound propagation occurs because for structural reasons the vibrations which arise at the moving (for example pivoting) or rotating component are transmitted via a rolling contact (for example tooth engagement) which moves. In addition there is the continuously changing distance from the mounted sensor system, which distance in turn influences the transmission function of the signal to the sensor. In the case of a planetary gear mechanism there is also, for example, the further substantial disadvantage that the phase position of the planet gears adversely affects the measurement result of the vibration which ultimately occurs at the sensor. For this reason, in most cases an evaluation of the vibration signal with the objective of reliable diagnosis of individual components of such a system is extremely critical and unreliable.

SUMMARY

The invention is based on the object of providing an apparatus for monitoring a machine part, in particular a transmission, which moves or rotates about its own axis and moves with respect to a base, which apparatus avoids the specified disadvantages and ensures reliable diagnosis and monitoring of such machine parts.

The defined problem is solved by an apparatus with one or more features of the invention.

An apparatus according to the invention for monitoring a machine part which moves with respect to a base and moves or rotates about its own axis firstly comprises a sensor and evaluation electronics. According to the invention, the sensor, the evaluation electronics and a power supply unit as well as a transmitting unit are arranged on the moving machine part.

The invention is particularly preferably applied for monitoring a transmission element in a transmission. In the case of a planetary gear mechanism, a planet gear which moves with respect to the base and rotates about its own axis can therefore be monitored.

The invention can, however, also be used in designs in which, for example, the inner ring and outer ring of a rolling bearing rotate (inter alia aircraft turbines, separators for separating substances, . . . ) since similar technical measuring problems occur here to those in planetary gear mechanisms.

In a particularly advantageous embodiment, the sensor is what is referred to as a smart sensor or intelligent sensor. This is a sensor which, in addition to determining the actual measurement variable, also combines all the signal conditioning, signal evaluation and a substantial signal processing means in one housing. The smart sensor advantageously includes, in addition to the vibration sensor element, an analog and/or digital signal processing means, a data memory and an interface, preferably standardized, for communicating with superordinate systems.

The standardized interface is preferably formed by passive or active radio technologies such as, for example, WLAN, WPAN (for example Bluetooth as a standard for the transmission of radio between devices over a short distance), mobile radio (for example GSM, UMTS) or RFID. A person of ordinary skill in the art understands the technologies which can be applied here and can suitably select and configure them.

The power supply to the smart sensor is preferably provided via what is referred to as an "energy harvester". The term "energy harvesting" refers to the generation of current from sources such as ambient temperature, vibrations or air flows. Known possibilities here are, inter alia, piezoelectric crystals which generate electrical voltages when a force is applied. For example, sensors in a vehicle may utilize the existing vehicle bodywork vibrations or rotations of bearings to acquire energy or utilize the waste heat of, for example, an engine via a thermoelectric generator.

When the gearwheels rotate about their own axis it is possible to convert the required electrical energy via an electric generator bearing, for example. Such generator bearings are known. Generator bearings may be, for example, permanently excited salient-pole or claw-pole generators in which the generator coil and corresponding electronics connected downstream are arranged directly on the rotating machine part. This can ensure a supply of energy to the sensor and to the transmitting unit. Such a generator could be, for example, integrated into the bearing of the respective planet gear or into the planet gear itself.

In one preferred embodiment, the sensor is of annular design. The sensor may, for example, also be integrated directly into a planet gear.

BRIEF DESCRIPTION OF THE DRAWINGS

The invention will be explained in more detail below with reference to the figures, of which.

DETAILED DESCRIPTION OF THE PREFERRED EMBODIMENTS

Figure 1:
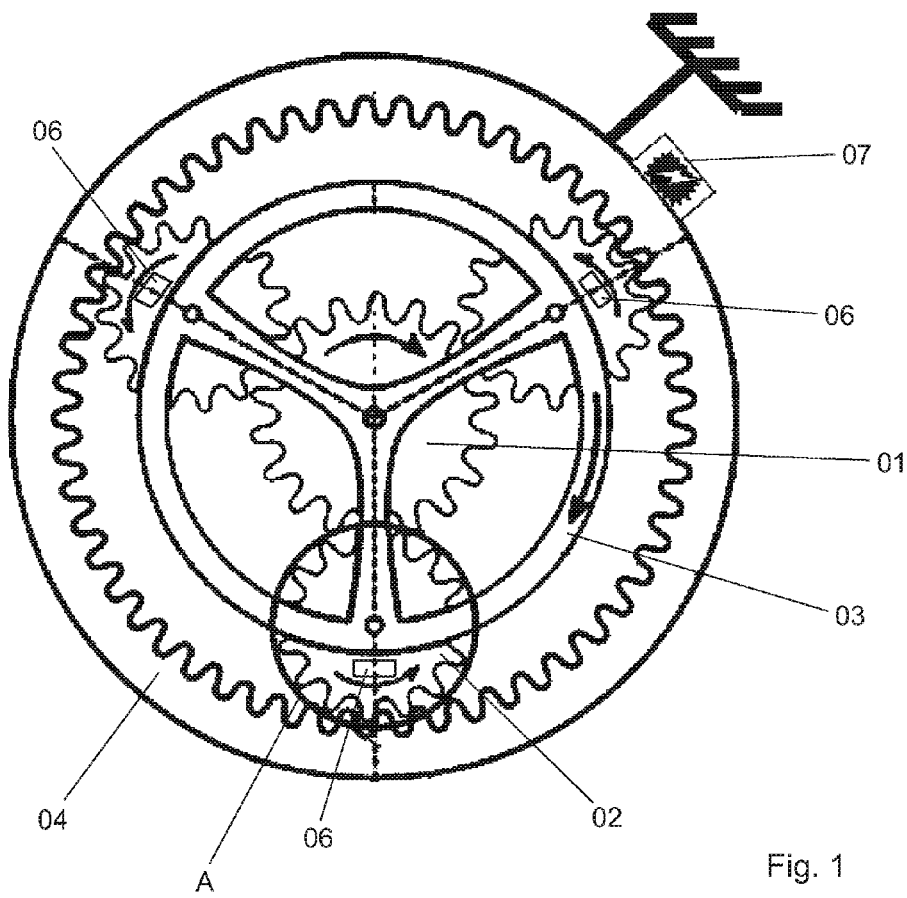
FIG. 1 shows a planetary gear mechanism in a plan view.

FIG. 1 shows a preferred embodiment of the invention using a planetary gear mechanism in a schematic illustration. The planetary gear mechanism comprises in a known fashion a centrally arranged sun gear 01 as well as planet gears 02 which engage thereon and which are rotatably attached to a planet carrier 03. The planetary gear mechanism also comprises a ring gear 04 which is located on the outside and in whose inner toothing the planet gears 02 engage.

The ring gear 04 is connected in a fixed fashion to a base or a transmission housing. If the planet carrier 03 is driven, the sun gear 01 forms the output of the transmission. However, it is likewise conversely possible to drive the sun gear 01, wherein the planet carrier 03 constitutes the output. In each of the cases, the planet gears 02 carry out a rotation about their own axis and a circulating movement with respect to the ring gear 04, i.e. the distance of said planet gears 02 from a fixed point on the ring gear 04 changes during one revolution of the drive shaft.

A smart sensor 06 is preferably arranged on each of the planet gears 02. A receiver 07, which receives the signals of the smart sensors 06, is provided on the ring gear 04.

Figure 2:
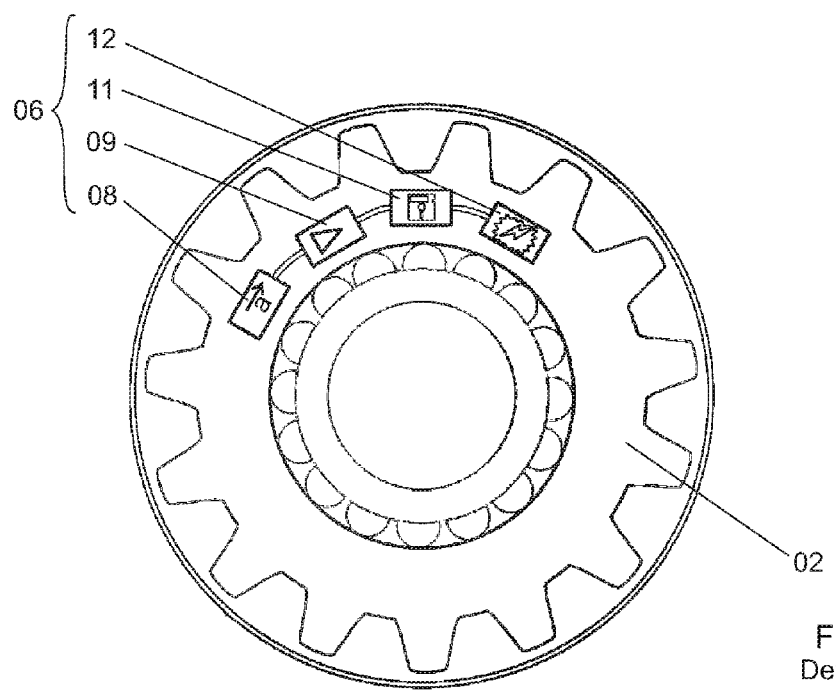
FIG. 2 shows a planet gear as a detail from FIG. 1.

FIG. 2 shows, as an illustration of a detail, an individual planet gear 02 (detail A from FIG. 1) of the planetary gear mechanism with the smart sensor 06 arranged thereon.

The smart sensor 06 comprises a vibration sensor element 08, an analog and/or digital signal processing unit 09, a data memory 11 as well as an integrated transmitting unit 12. These elements are illustrated only symbolically. Corresponding implementations are known to a person skilled in the art.

Depending on the installation space available in the structure to be monitored, the components can also be arranged in a differently distributed fashion on the planet gear or integrated therein if an integrated smart sensor is not used.

The supply of energy to the smart sensor 06 is preferably carried out by a generator bearing (not illustrated) which can be integrated, for example, into the bearing point of the planet gear in the planet carrier 03.

LIST OF REFERENCE NUMBERS

01—Sun gear
02—Planet gear
03—Planet carrier
04—Ring gear
05— —
06—Smart sensor
07—Receiving unit
08—Vibration sensor
09—Signal processor
10— —
11—Data memory
12—Transmitting unit

The invention claimed is:

1. An assembly comprising a machine element and an apparatus for monitoring the machine element, the machine element comprises a planet gear of a planetary gear mechanism which moves with respect to a base, and rotates about its own axis, the apparatus comprising a sensor and evaluation electronics, the sensor and the evaluation electronics as well as a power supply unit and a transmitting unit are arranged on the planet gear of the planetary gear mechanism, and a receiver connected to a ring gear on which the planet gear travels that receives signals from the sensor.

2. The assembly as claimed in claim 1, wherein the sensor is a smart sensor which comprises a measured variable detection system, signal conditioning system, signal evaluation system and signal processor in one housing.

3. The assembly as claimed in claim 1, wherein the power supply unit is a generator which is integrated into a bearing arrangement of the machine element, an energy harvester or an energy store.

4. The assembly as claimed in claim 1, wherein the sensor is annular or is shaped as an annular section.

5. The assembly as claimed in claim 1, wherein the sensor is integrated into the planet gear.

6. The assembly as claimed in claim 1, wherein the transmitting unit is a radio transmitting unit.

7. The assembly as claimed in claim 6, wherein the radio transmitting unit (12) operates by a WPAN, WLAN, or UMTS protocol.

8. The assembly as claimed in claim 1, further comprising a plurality of moving machine elements each of which comprises a planet gear that has a separate sensor and evaluation electronics, and a common receiving unit is arranged fixed to a housing, and the separate sensor and the evaluation electronics as well as a power supply unit and a transmitting unit are arranged on each of the planet gears.

9. The assembly as claimed in claim 1, wherein the planet gear includes an axial end side normal to the axis of the planet gear, and the sensor, the evaluation electronics, the power supply unit, and the transmitting unit are arranged on the axial end side of the planet gear.

* * * * *